United States Patent
Armellino

Patent Number: 5,899,249
Date of Patent: May 4, 1999

[54] FUEL SPILL COLLECTOR DEVICE

[76] Inventor: Gary Armellino, 150 Washington St., St. Augustine, Fla. 32084

[21] Appl. No.: 08/867,830

[22] Filed: Jun. 2, 1997

Related U.S. Application Data

[63] Continuation-in-part of application No. 08/419,047, Apr. 10, 1995, Pat. No. 5,662,149.

[51] Int. Cl.[6] .................................................. B67D 5/378
[52] U.S. Cl. .............................. 141/382; 141/59; 141/86; 141/392
[58] Field of Search .................................... 141/59, 86–88, 141/382, 392

[56] References Cited

U.S. PATENT DOCUMENTS

| | | | |
|---|---|---|---|
| 2,058,118 | 10/1936 | White | 141/382 |
| 2,123,637 | 7/1938 | Sherbondy | 141/382 |
| 2,214,708 | 9/1940 | Mayne et al. | 141/382 |
| 3,840,055 | 10/1974 | Wostl et al. | 141/392 |
| 3,899,009 | 8/1975 | Taylor | 141/59 |
| 3,907,010 | 9/1975 | Burtis et al. | 141/59 |
| 3,946,771 | 3/1976 | Braun et al. | 141/59 |
| 4,004,621 | 1/1977 | Weidenaar et al. | 141/392 |
| 4,060,108 | 11/1977 | Weston et al. | 141/59 |
| 4,130,148 | 12/1978 | Keller | 141/392 |
| 5,230,372 | 7/1993 | Westphal | 141/86 |
| 5,571,249 | 11/1996 | Boylen | 141/86 |
| 5,636,671 | 6/1997 | Harris et al. | 141/392 |

*Primary Examiner*—J. Casimer Jacyna
*Attorney, Agent, or Firm*—Thomas C. Saitta

[57] ABSTRACT

A fuel spill collector device having a hollow body mounted onto the spout of a fuel pump delivery nozzle, where the end of the spout extends completely through the hollow body, the hollow body having an entrance flow guide member aperture to receive the spout and an exit flow guide aperture for passage of the end of the spout out of the hollow body, there being a gap between the spout and exit flow guide member so that fuel backsplash will flow into the interior of the hollow body when the fuel filler line or tank is blocked or full. The exit flow guide seals the fuel fill fitting to prevent any spillage into the environment. When the fuel filling process ceases, the fuel captured within the hollow body flows back into the fuel line. Ribs may be provided to maintain the gap between the device and the spout.

4 Claims, 6 Drawing Sheets

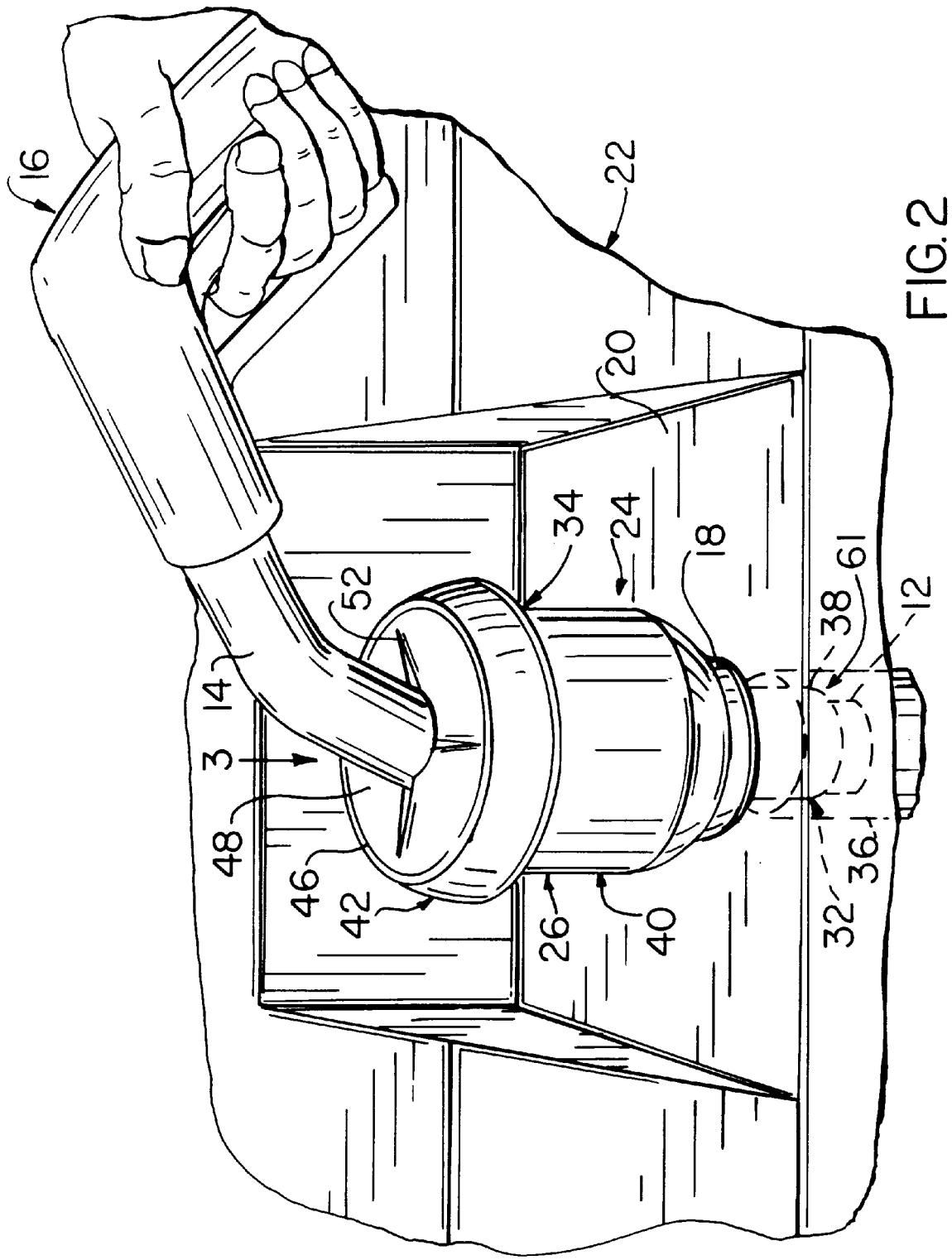

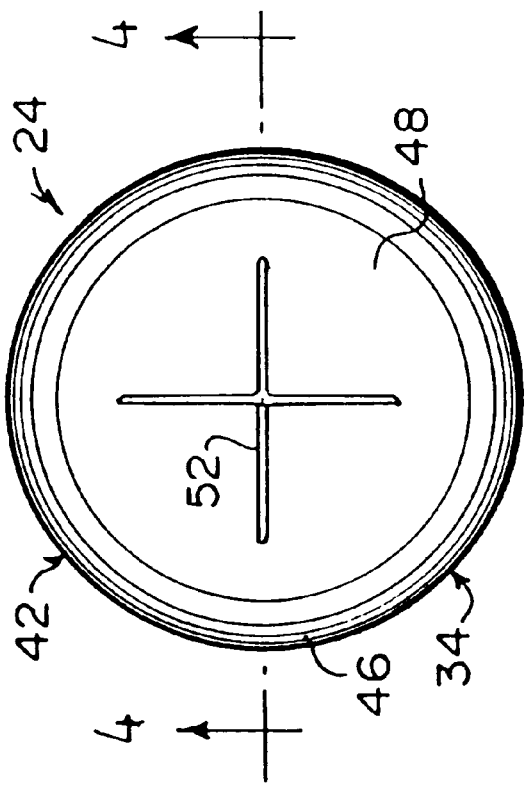
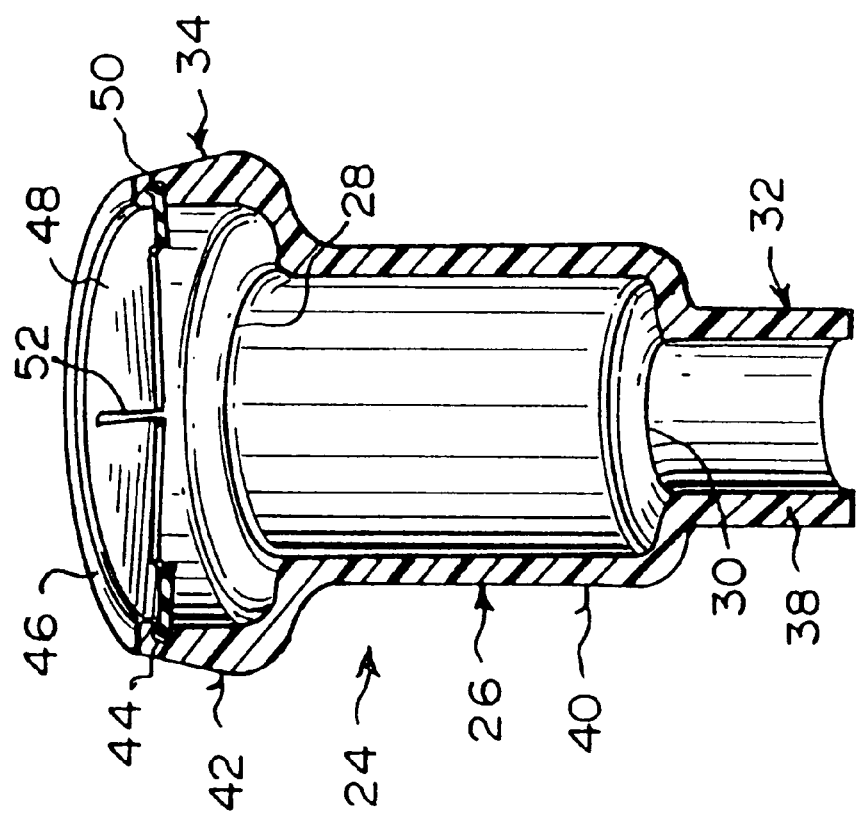

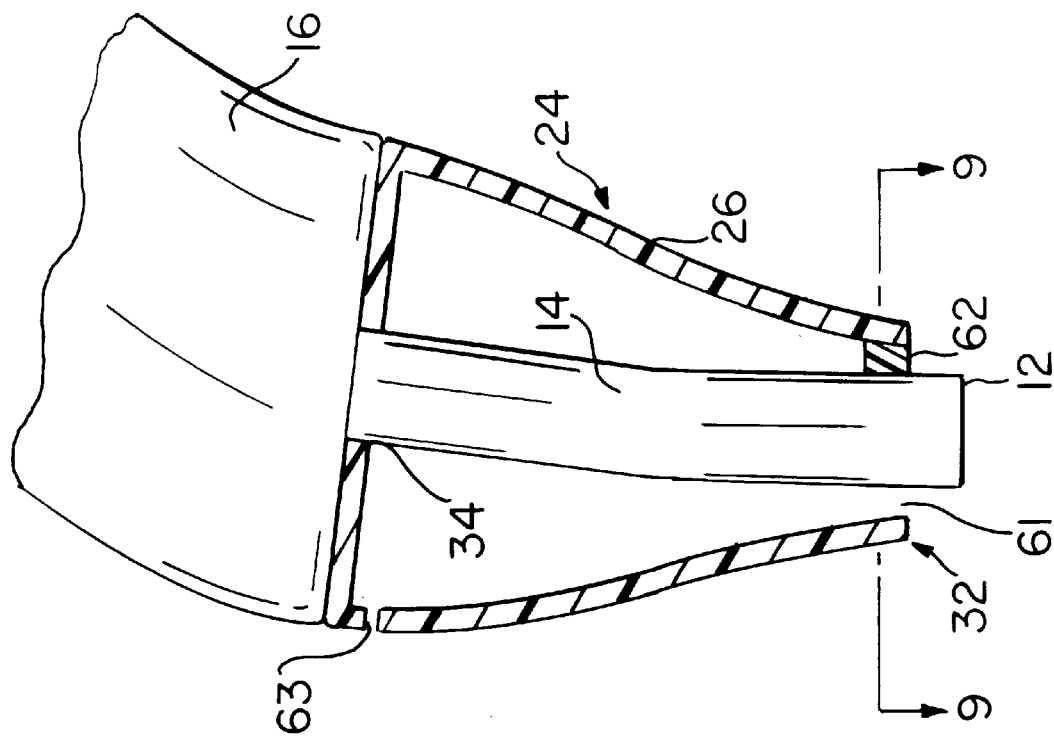
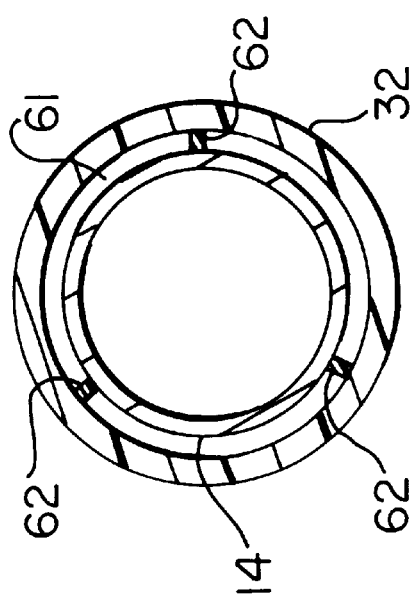

FUEL SPILL COLLECTOR DEVICE

This application is a continuation-in-part application of Ser. No. 08/419,047, filed Apr. 10, 1995, now U.S. Pat. No. 5,662,149.

BACKGROUND OF THE INVENTION

This invention relates generally to the field of devices used to prevent or collect spillage or splattering of fuel during the fueling process. More particularly, the invention relates to such devices which are designed for use in combination with the fueling nozzle or spout and the fitting or fuel pipe opening in the receiving boat, automobile, truck or other fuel receiving entity. Even more particularly, the invention relates to such devices which fit onto the fueling spout such that the fueling spout extends completely through the device.

Modern fuel supply pumps are designed to deliver fuel into a receiving fuel pipe at a high rate of speed. Most pumps are provided with automatic shut-off mechanisms in the event of backflow through the fuel pipe opening, either because the fuel tank is filled or because the flow rate is too fast to allow the delivered fuel to completely drain from the pipe into the fuel tank. In either event fuel spillage of small amounts, or even large amounts of fuel when the automatic shut-off fails to operate properly, is very common.

Various devices have been developed to address this problem, some of which are mounted within the fuel receiving entity itself, and others which are temporarily placed into the fuel receiving pipe opening or placed onto the fuel delivery nozzle. Examples of the latter type devices are found, for example, in U.S. Pat. No. 5,074,343 to Tyree, Jr., which shows a displacement unit which extends into the fuel tank such that the tank cannot be completely filled with the unit in place. Once filling is stopped, the unit is raised from the tank and fuel remaining in the unit drains into the tank to fill it. U.S. Pat. No. 5,168,908 to Boyum shows a funnel which includes a bowl integrally formed with a pour spout or nozzle, which includes an outwardly spaced arcuate flange which extends in spaced relation thereto to engage the sidewall of the fill spout opening in the tank, which allows visual inspection of the fuel flow relative to the opening. U.S. Pat. No. 5,277,234 to Warstler shows a truncated conical funnel head directed into a cylindrical guide conduit. A plurality of spaced parallel channels are directed into the funnel head. The guide conduit extends from a lowermost end of the funnel to an uppermost end to permit venting when the funnel is directed within the opening of a container. U.S. Pat. No. 5,385,180 to Wittman shows a funnel with stepped fins and blades extending form the outer and inner surfaces of the funnel body. The fins allow the funnel to be variably positioned relative to the container opening, while the blades allow a pouring container to be securely placed within the funnel. U.S. Pat. No. 2,718,344 to Troster shows a funnel with a number of threaded components. The funnel is threaded into a receiving member in the filler pipe, a threaded member is mounted onto the fuel delivery nozzle and that member is then threaded into the funnel.

U.S. Pat. No. 5,230,372 to Westphal shows a device having a cylindrical fuel receiving chamber connected to a truncated conical funnel which is inserted into the fuel pipe opening. The fuel nozzle is inserted into the top of the cylindrical chamber, and fuel overflow may be observed in the cylindrical portion. U.S. Pat. No. 5,322,099 to Langlois shows a similar device, but with the addition of a tube extending part way into the cylindrical chamber. A major problem with these two devices is that the fuel nozzle spout is simply inserted into the main cylindrical chambers, which leaves a large gap for spillage of fuel as well as an escape path for fumes. Since automatic shut-off is actuated by conditions within the nozzle, separating the spout from the filler pipe opening means that fuel must sufficiently fill the cylindrical sections before shut-off will occur. If the tank is completely filled when this occurs, there will be no space for the fuel to drain.

It is an object to provide a fuel spill collector device which is mountable onto the spout of a fuel delivery nozzle, either temporarily or permanently, which prevents spillage, captures any fuel backsplash and suppresses fuel fumes, where the fuel spout extends completely through the device and into the fuel receiving pipe of the receiving entity, such that automatic cut-off will occur before the tank and fuel pipe are completely filled. It is a further object to provide such a device which is simple and economical in manufacture and use. It is a further object to provide such a device which is generally sealed or closed at its top end to prevent escape of fuel or fumes, which is also sufficiently short to allow the fuel spout to extend through the bottom end, where the bottom end has a lower cylindrical collar having an outer diameter sized to correspond with the inner diameter of the fuel fill fitting or pipe and having an inner diameter greater than the outer diameter of the spout such that a gap is provided to receive backflow of fuel which occurs prior to the automatic shut-off being activated.

SUMMARY OF THE INVENTION

The invention is a spill collector device which is used in conjunction with the fuel delivery nozzles on fuel pumps used to supply fuel to a tank, and in particular to a fuel tank within a motor vehicle such as a boat, automobile, truck or airplane. The device has a hollow body, preferably made of a flexible plastic, rubber or elastomer, which receives the spout of the nozzle. The spout is inserted into an entrance flow guide member, completely through the hollow body, and out of an exit flow guide member, such that the end of the spout extends beyond the device. The inner diameter of the exit flow guide member is sized larger than the outer diameter of the spout, so that a gap is always present to allow fuel back flow to pass into the interior of the device, as will occur when the line is backed up during the filling process or when the tank is full. The outer diameter of the exit flow guide member abuts the fuel fill fitting to prevent fuel from spilling into the environment. When the fuel delivery nozzle shuts off due to the back flow or pressure, any back flow fuel which was captured by the device will flow back into the filler pipe. The device also captures fumes created during the filling process.

BRIEF DESCRIPTION OF THE DRAWINGS

FIG. 2 is a perspective view of an embodiment of the invention, showing the device as receiving the fuel delivery spout and positioned in the fuel pipe opening.

FIG. 3 is a top view of the device of FIG. 2, taken in the direction of arrow 3 in FIG. 2.

FIG. 4 is a perspective cross-sectional view taken generally along line 4—4 of FIG. 3.

FIG. 8 is a cross-sectional view of another embodiment of the invention, showing the device as a unitary member positioned on the fuel spout.

FIG. 9 is a cross-sectional view of the device of FIG. 8, taken along line 9—9 of FIG. 8.

DETAILED DESCRIPTION OF THE INVENTION

Figure 1:
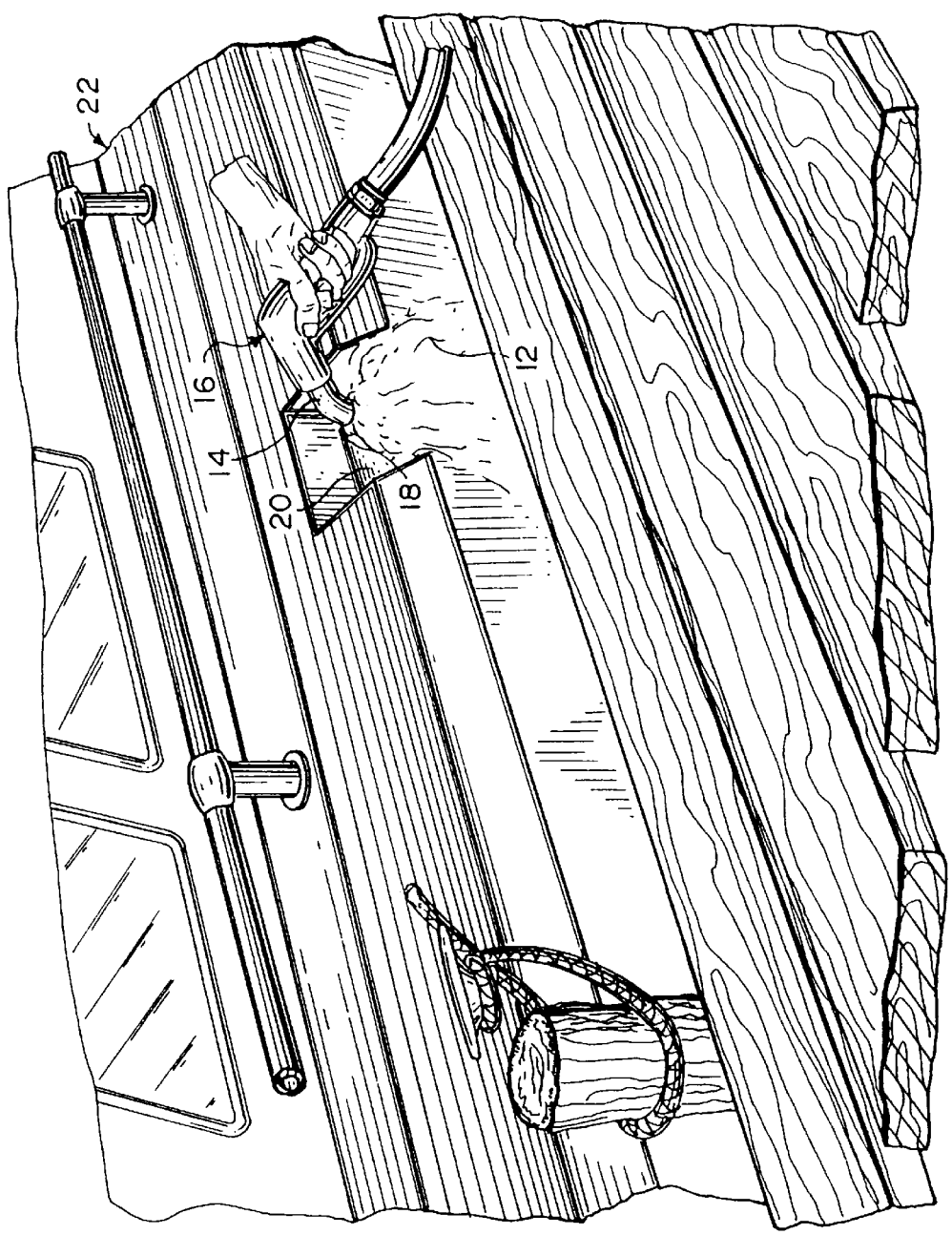
FIG. 1 is an illustration of problems found in prior art, where fuel backflow is spilling from the fuel fill fitting of a boat.

With reference to the drawings, the invention will now be described in detail with regard to the best mode and preferred embodiment. The invention is in general a fuel spill collector device which prevents spillage or escape of fuel or vapors during a fueling operation from a fuel pump, such as when refueling a boat, automobile or the like. The typical problem is illustrated in FIG. 1, which shows a fuel spill 1 coming from the elongated, tubular spout 14 of a fuel pump nozzle 16 inserted into a fuel fill fitting 18 on the deck 20 of a boat 22, the fuel fill fitting 18 being the opening to the filler pipe 36 and fuel tank which is sized to receive the spout 14 of the fuel pump nozzle 16.

FIGS. 2 through 7 show the invention as being a fuel spill collector device 24 comprising a hollow body 26 having an open top end 28 and an open bottom end 30. An exit flow guide member 32 is at the open bottom end 30 of the hollow body 26 and serves to align and position the device in the fuel fill fitting 18 as well as providing the passageway for insertion of the spout 14 of the fuel pump nozzle 16 therethrough. An entrance guide member 34 is at the open top end 28 of the hollow body 26 and serves to tightly receive the elongated, tubular spout 14 of the fuel pump nozzle 16. The spout 14 of the fuel pump nozzle 16 is inserted into the entrance flow guide member 34 and positioned so that it extends into, through and past the device 24, the end 12 of the spout 14 extending past the exit flow guide member 32 in order to pump fuel into the fuel filler pipe or line 36.

The exit flow guide member 32 is a lower cylindrical collar 38 integral with and extending about said open bottom end 30 of said hollow body 26. The hollow body 26 shown in FIGS. 2, 4, 5 and 6 is a cylindrical cup-shaped housing 40, in which the diameter of the open top end 28 is larger than the diameter of the open bottom end 30. The hollow body 26 or housing 40 may be configured in any number of different sizes and shapes, such as spherical, oval, conical, etc., without departing from the spirit and function of the invention. The outer diameter of the lower cylindrical collar 38 is sized to fit within and generally abutting the fuel fill fitting 18 on the fuel filler line 36, which connects to a fuel tank (not shown). The inner diameter of the lower cylindrical collar 38 forming the exit flow guide member 32 is of greater diameter than the outer diameter of the end 12 of the spout 14, so that a gap 61 is present between the collar 38 and the spout 14. This gap 61 provides the flow passageway which allows any fuel backsplash to flow into the hollow body 26, thus preventing any spillage. The hollow body 26 is sized sufficiently large to receive and retain and expected volume of fuel which may be ejected from the fuel fill fitting 18 prior to the nozzle 16 shutting down fuel delivery in response to the back flow. When the fuel flow is cut off, the small amount of fuel in the hollow body 26 drains back into the filler pipe 36.

The entrance flow guide member 34 in FIGS. 2 through 4 consists of an upper cylindrical collar 42 integral with and extending about the open top end 28 of the hollow body 26. The upper cylindrical collar 42 has an internal ring-shaped groove 44 near its upper edge 46. A disk-shaped flexible cover 48 with a bead 50 about a peripheral edge is carried in an affixed manner within the ring-shaped groove 44. The cover 48 has a cross-shaped slot 52 therethrough to receive the spout 14 of the fuel pump nozzle 16, the slot 52 being sized to provide a relatively good seal around spout 14 to prevent any fuel from spilling from the cover 48.

Figure 5:
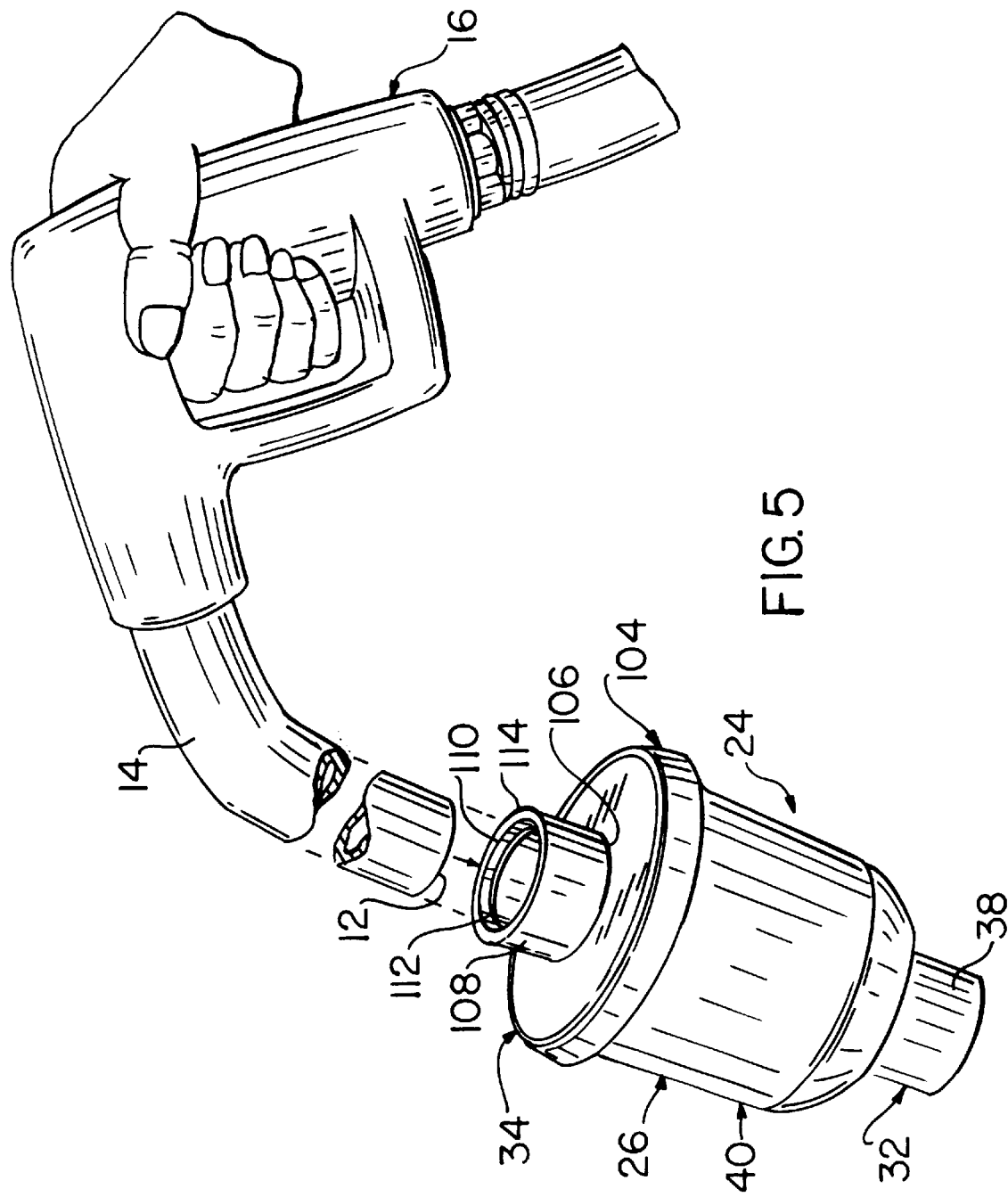
FIG. 5 is a perspective view of another embodiment of the invention, prior to insertion of the fuel spout into the invention.
Figure 7:
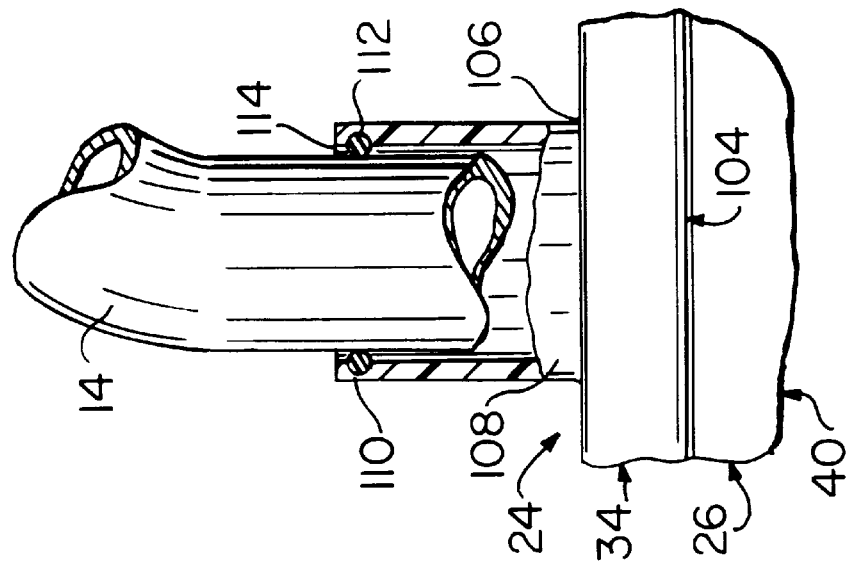
FIG. 7 is an enlarged view with parts broken away and in section taken in the direction of arrow 10 in FIG. 6, showing the O-ring seal in greater detail.
Figure 6:
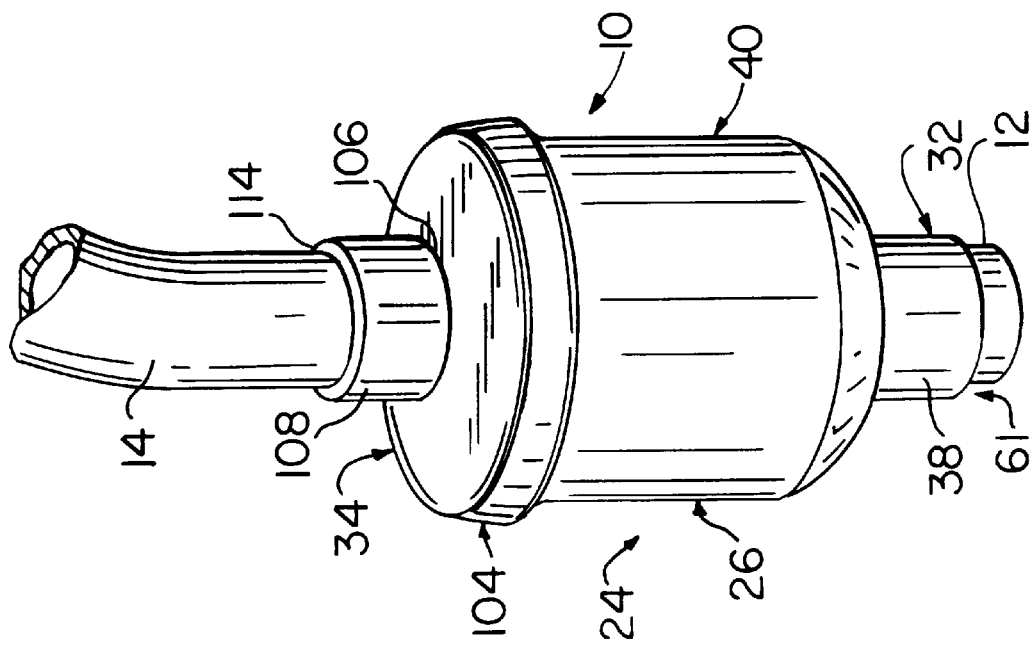
FIG. 6 is a perspective view of the device of FIG. 5 as installed onto the fuel spout.

In FIGS. 5 through 7, the entrance flow guide member 34 includes a cylindrical cap 104 having a central aperture 106 therethrough. The cap 104 snaps onto the open top end 28 of the hollow body 26. A short tube 108 extends upwardly from the central aperture 106 in cap 104. The short tube 108 has an internal annular channel 110 U-shaped in cross-section and is sized to receive the spout 14 of the fuel pump nozzle 16. An O-ring seal member 112 is carried within the annular U-shaped channel 110 in the short tube 108 near an upper open end 114. The spout 14 of the fuel pump nozzle 16 will snugly seal fit about the short tube 108 and the spout end 12 will extend out of the lower cylindrical collar 38. The O-ring 112 will prevent fuel coming out of the spout 14 from backing out of the short tube 108, as well as trapping fumes.

Another alternative embodiment is shown in FIGS. 8 and 9, where the spill collector device 24 is illustrated as having a hollow body 26 formed as a unitary, single-piece member with no separate cap or cover. The device is preferably shaped to generally match or mate with the large plastic portions of the fuel delivery nozzle 16 to provide a more aesthetically pleasing combination. The entrance flow guide member 34 simply comprises a circular aperture which tightly receives the spout 14 of the fuel delivery nozzle 16. A small vent 63 is provided to prevent pressurization of the system during fueling. The exit flow guide member 32 is a generally tapered portion of the hollow body 26 which is preferably structured with some flexibility to better mate with and seal the fuel fill fitting 18. As shown the end 12 of the fuel spout 14 extends through and beyond the exit flow guide member 32, and gap 61 allows fuel back flow to enter the hollow body 26. Preferably, a number of radially extending rib members 62 are provided to better center the spout 14 within the exit flow guide member 32 and to insure that gap 61 remains open when the device 24 is inserted into the fuel fill fitting 18.

It is understood that equivalents and substitutions for certain elements or components set forth above may be apparent to those skilled in the art. The true scope and definition of the invention therefore is to be as set forth in the following claims.

I claim:

1. A fuel spill collector device for delivering fuel into a circular fuel fill fitting on a fuel pipe, said device comprising in combination:

(A) a fuel pump delivery nozzle having an elongated, tubular spout with an end for delivery of fuel;

(B) a hollow body mounted onto said spout whereby said spout extends completely through said hollow body, said hollow body comprising an entrance flow guide member into which said spout is inserted and an exit flow guide member through which said end of said spout extends, further comprising a gap between said spout and said exit flow guide member to allow passage of fuel backsplash into said hollow body during a fuel filling operation, where said hollow body further comprises a top end and a bottom end, where the diameter of said top end is greater than the diameter of said bottom end, and where said exit flow guide comprises ribs located at said bottom end extending radially inward and contacting said spout to define said gap and further comprises a tapered portion of said hollow body which fits within the interior of a circular fuel fill fitting of a fuel pipe in a sealing manner to prevent escape of fuel backsplash or vapors to the atmosphere.

2. The device of claim 1, where said entrance flow guide member tightly receives said spout to prevent passage of fuel backsplash therebetween.

3. The device of claim 1, where said entrance flow guide member comprises a circular aperture.

4. The device of claim 1, where said hollow body is a unitary, single-piece member.

\* \* \* \* \*